United States Patent
Haddeland et al.

(10) Patent No.: US 12,454,410 B2
(45) Date of Patent: Oct. 28, 2025

(54) SYSTEM AND METHOD OF TEMPERATURE CONTROL IN AN AUTOMATED GRID BASED STORAGE AND RETRIEVAL SYSTEM

(71) Applicant: Autostore Technology AS, Nedre Vats (NO)

(72) Inventors: Ole Andreas Haddeland, Avaldsnes (NO); Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 292 days.

(21) Appl. No.: 18/252,639

(22) PCT Filed: Nov. 19, 2021

(86) PCT No.: PCT/EP2021/082371
§ 371 (c)(1),
(2) Date: May 11, 2023

(87) PCT Pub. No.: WO2022/112137
PCT Pub. Date: Jun. 2, 2022

(65) Prior Publication Data
US 2024/0002150 A1    Jan. 4, 2024

(30) Foreign Application Priority Data

Nov. 25, 2020 (NO) .................................. 20201296

(51) Int. Cl.
*B65G 1/04* (2006.01)
*B65G 1/06* (2006.01)
*F25D 13/04* (2006.01)
*F25D 17/00* (2006.01)
*F25D 17/04* (2006.01)

(52) U.S. Cl.
CPC ........... *B65G 1/0464* (2013.01); *B65G 1/065* (2013.01); *F25D 13/04* (2013.01); *F25D 17/005* (2013.01); *F25D 17/045* (2013.01)

(58) Field of Classification Search
CPC ....... B65G 1/0464; B65G 1/065; F25D 13/04; F25D 17/005; F25D 17/045
See application file for complete search history.

(56) References Cited

U.S. PATENT DOCUMENTS

2015/0291357 A1* 10/2015 Razumov ............. B65G 1/1373
414/807
2017/0176082 A1* 6/2017 Hognaland .............. B65G 1/02
(Continued)

FOREIGN PATENT DOCUMENTS

BE          442422 A       9/1941
JP          S61-34086 U    3/1986
(Continued)

OTHER PUBLICATIONS

International Search Report issued in PCT/EP2021/082371 on Mar. 4, 2022 (5 pages).
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

An automated grid based storage and retrieval system includes a framework structure including upright members and a grid of horizontal rails provided at upper ends of the upright members. The framework structure defines a plurality of storage volumes arranged adjacent one another below the horizontal rails. The storage volumes are open against the horizontal rails such that storage container vehicles may lower and raise storage containers into and out of the storage volumes. The system includes a plurality of vertical walls surrounding each of the plurality of storage volumes, and a cooler system adapted to draw air from an input of the cooler system, cool the air drawn from the input, and blow cooled air through an output of the cooler system. For each of the plurality of storage volumes, the system further includes a (Continued)

first air damper connected between the output of the cooler system and an air release area above the storage volume, and a second air damper connected between a void beneath the storage volumes and the input of the cooler system. The system includes a controller. The controller is adapted, independently for each of the plurality of storage volumes, to adjust airflow through the first air damper associated with that storage volume to control an overpressure and air temperature in the air release area, and to adjust airflow through the second air damper associated with that storage volume to control an underpressure in the void, such that a storage volume temperature is controlled separately for each of the plurality of storage volumes. The storage volume temperature is regulated by the air temperature in the air release area and by controlling a pressure differential between the overpressure in the air release area and the underpressure in the void in each of the storage volumes.

17 Claims, 5 Drawing Sheets

(56) References Cited

U.S. PATENT DOCUMENTS

2022/0026139 A1* 1/2022 LaValley ............... F25D 11/003
2023/0028034 A1* 1/2023 Gravelle ............... B65G 1/0485
2023/0194140 A1* 6/2023 Meuth ................... B65G 1/137
                                                                62/62
2023/0314059 A1* 10/2023 Austrheim ........... B65G 1/0464
                                                                62/407

FOREIGN PATENT DOCUMENTS

| NO | 317366 B1 | 10/2004 |
| WO | 2014/075937 A1 | 5/2014 |
| WO | 2014/090684 A1 | 6/2014 |
| WO | 2015/124610 A1 | 8/2015 |
| WO | 2015/193278 A1 | 12/2015 |
| WO | 2016/193419 A1 | 12/2016 |
| WO | 2017/121512 A1 | 7/2017 |
| WO | 2018/146304 A1 | 8/2018 |

OTHER PUBLICATIONS

Written Opinion of the International Searching Authority issued in PCT/EP2021/082371 on Mar. 4, 2022 (6 pages).
International Preliminary Report on Patentability issued in PCT/EP2021/082371, mailed on Mar. 3, 2023 (18 pages).
Written Opinion of the International Preliminary Examining Authority issued in PCT/EP2021/082371, mailed on Oct. 31, 2022 (7 pages).
Norwegian Search Report issued in NO 20201296, mailed on Jun. 25, 2021 (2 pages).
Yousufi, Stefanie, Extended European Search Report in EP24218493.5, mailed May 14, 2025, 10 pages, European Patent Office, Munich, Germany.

* cited by examiner

SYSTEM AND METHOD OF TEMPERATURE CONTROL IN AN AUTOMATED GRID BASED STORAGE AND RETRIEVAL SYSTEM

The present invention relates to an automated storage and retrieval system for storage and retrieval of containers, in particular to a system and method of ventilating the automated storage and retrieval system.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 121 which typically is computerized and which typically comprises a database for keeping track of the storage containers 106.

Some of the above systems 1 may be used to store product items which require a certain environment. For example, some types of food require a cool temperature environment (typically temperatures between 1° C.-6° C.), some types of food require an even colder temperature environment (typically temperatures lower than −15° C.), and other types of food require a higher temperature environment (typically temperatures above 10° C.).

In buildings in which such storage systems are located, ventilation systems are typically used to provide the desired environment. However, with the space efficiency obtained by storing the containers in stacks adjacent to each other, less air is available in the storage area for the temperature control of the stored products.

WO2015/124610A1 discloses an automated storage and retrieval system, where the storage volume is subdivided into a number of sections separated from each other by thermal insulation, and the temperature in the number of sections is lower than the temperature where the container handling vehicles move on the rail system above the storage volume. The sections may be cooled to different temperatures, e.g. by connecting a cooling unit to one of the sections.

In WO2016/7193419, it is disclosed a storage system where the containers are cooled during storage in a grid. The cooling system has a chiller above the grid to cool the air, and a fan circulating the cooled air through the storage system by drawing air through the system and into a vacant space under the stacks of storage containers such that the air is circulated through the stacks to regulate their temperature. The fans are positioned outside, on the side of the grid, above a bounded volume that draws air from a large number of stacks. As the air is drawn from the outside the grid, the airflow will be highest near the fan, i.e. near the edge of the grid, and decrease towards the middle of the grid.

A problem with the prior art solutions is that it is relies on a separate cooler element for each temperature zone.

In view of the above it is desirable to provide an automated storage and retrieval system, and a method of operating such as system, that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

The present invention relates to an automated grid based storage and retrieval system, comprising:
- a framework structure comprising upright members and a grid of horizontal rails provided at upper ends of the upright members, the framework structure defining a plurality of storage volumes arranged adjacent one another below the horizontal rails,
- a plurality of vertical walls surrounding each of the plurality of storage volumes,
- a cooler system adapted to draw air from an input of the cooler system, cool the air drawn from the input, and blow cooled air through an output of the cooler system,
- for each of the plurality of storage volumes, the system further comprises a first air damper connected between the output of the cooler system and an air release area above the storage volume, and a second air damper connected between a void beneath the storage volumes and the input of the cooler system,
- a controller, the controller adapted, independently for each of the plurality of storage volumes, to adjust airflow through the first air damper associated with that storage volume to control an overpressure and air temperature in the air release area, and to adjust airflow through the second air damper associated with that storage volume to control an underpressure in the void,
- such that a storage volume temperature is controlled separately for each of the plurality of storage volumes, the storage volume temperature being regulated by the air temperature in the air release area and by controlling a pressure differential between the overpressure in the air release area and the underpressure in the void in each of the storage volumes.

In an embodiment, the air release area may be arranged above the horizontal rails at a distance allowing a container handling vehicle on the horizontal rails to move immediately below the air release area.

In an embodiment, the air release area may be arranged below the horizontal rails adjacent the upper ends of the upright members.

In an embodiment, the vertical walls may comprise a thermal insulating material.

In an embodiment, the cooler system may comprise a heat exchanger, the heat exchanger adapted to cool the air drawn from the input, and further adapted to transfer heat to at least one of the plurality of storage volumes.

In an embodiment, the system may further comprise a fan positioned between the void and the second air damper.

In an embodiment, the cooler system may be a fan-coil unit.

In an embodiment, each of the storage volumes may comprise temperature sensor, and the controller is adapted to adjust the airflow through the first air damper and to adjust the airflow through the second air damper based on a temperature measured by the temperature sensor.

In an embodiment, the system may further comprise a floor with a plurality of ventilation holes provided between the storage volume and the void beneath the storage volume, where a total area of each of the plurality of ventilation holes increases with the horizontal distance of the ventilation hole from an air outlet communicating air from the void to the second air damper.

In an embodiment, the plurality of ventilation holes may be provided by a plurality of perforations in panels forming the floor arranged between the storage volumes and the void at a lower end of the storage volumes.

In an embodiment, each air release area may be adapted to shield the air release areas from each neighboring air release area.

In an embodiment, the system may further comprise a first common conduit connecting the output of the cooler system with each of the first air dampers, and a second common conduit connecting each of the second air dampers to the input of the cooler system.

The present invention also relates to a method for controlling a plurality of storage volume temperatures in the automated grid based storage and retrieval system comprising the steps of:
- adjusting the cooler system to blow cooled air through the output of the cooling system at a first temperature,
- adjusting, independently for each of the plurality of storage volumes, the airflow through the first air damper to control the overpressure and the air temperature in the air release area above that storage volume, and the airflow through the second air damper to control the underpressure in the void below that storage volume, such that the storage volume temperature is regulated by the air temperature in the air release area above that storage volume and by controlling the pressure differential between the overpressure in the air release area and the underpressure in the void associated with that storage volume for each of the storage volumes.

In an embodiment, the method may further comprise the step of directing the airflow from the first air damper to an air release area arranged below the horizontal rails adjacent the upper ends of the upright members.

In an embodiment, the method may further comprise the step of transferring heat from a heat exchanger in the cooler system to at least one of the plurality of storage volumes.

In an embodiment, the method may further comprise adjusting a fan positioned between the void and the second air damper to adjust the underpressure in the void.

In an embodiment, the method may further comprise adjusting the first air damper and the second air damper for a given storage volume based on a temperature measured by a temperature sensor in that storage volume.

BRIEF DESCRIPTION OF THE DRAWINGS

Following drawings are appended to facilitate the understanding of the invention. The drawings show embodiments of the invention, which will now be described by way of example only, where:

FIG. 5b is a top view of the exemplary bottom panel of FIG. 5a.

DETAILED DESCRIPTION OF THE INVENTION

Figure 1:
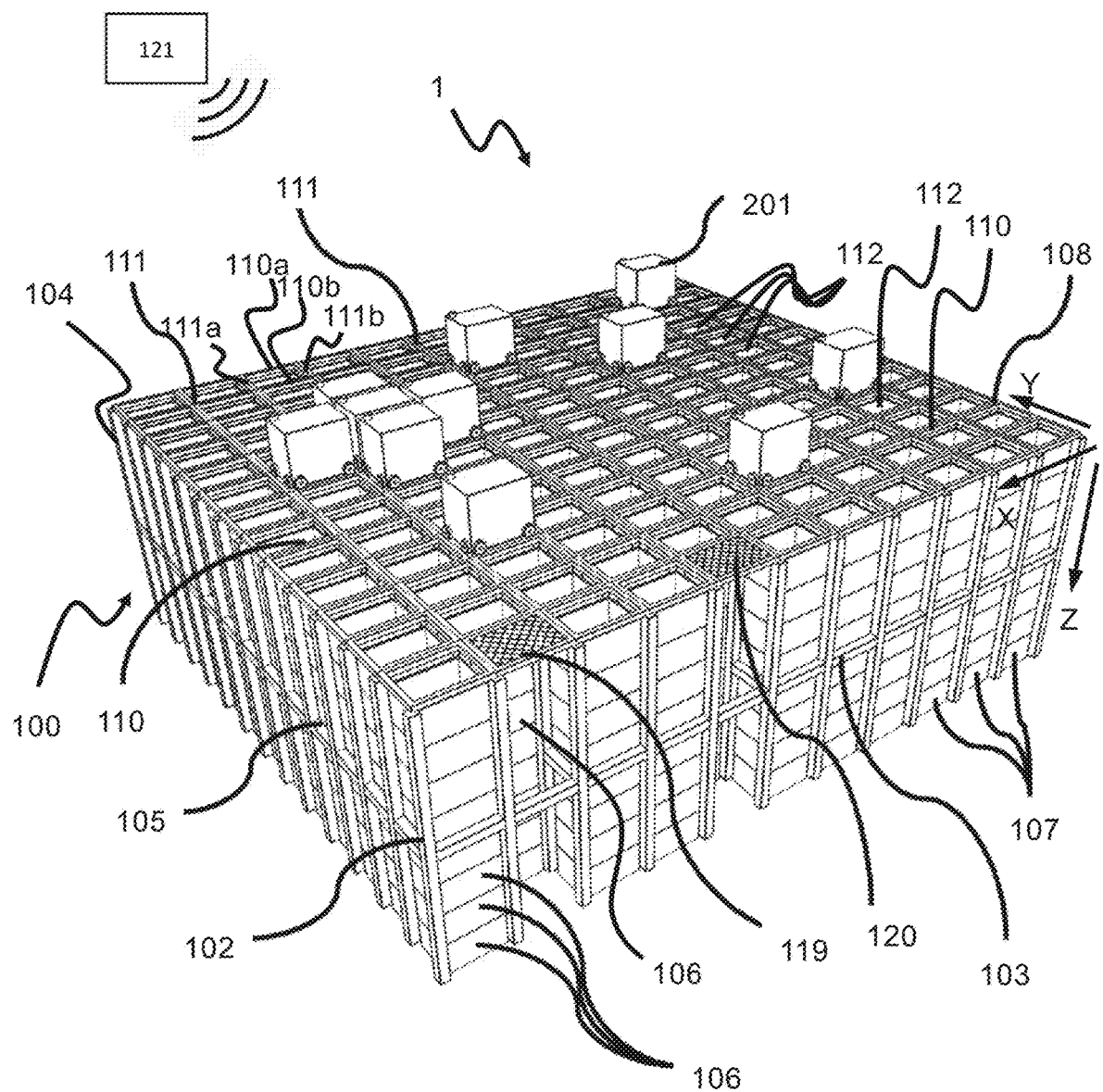
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
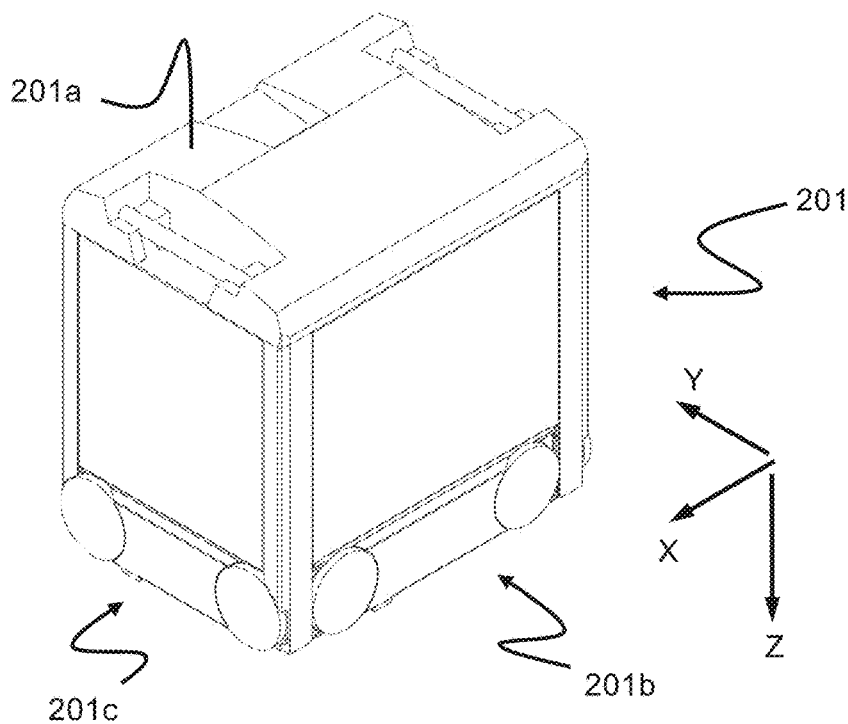
FIG. 2 is a perspective view of a prior art container handling vehicle having a centrally arranged cavity for carrying storage containers therein.
Figure 3:
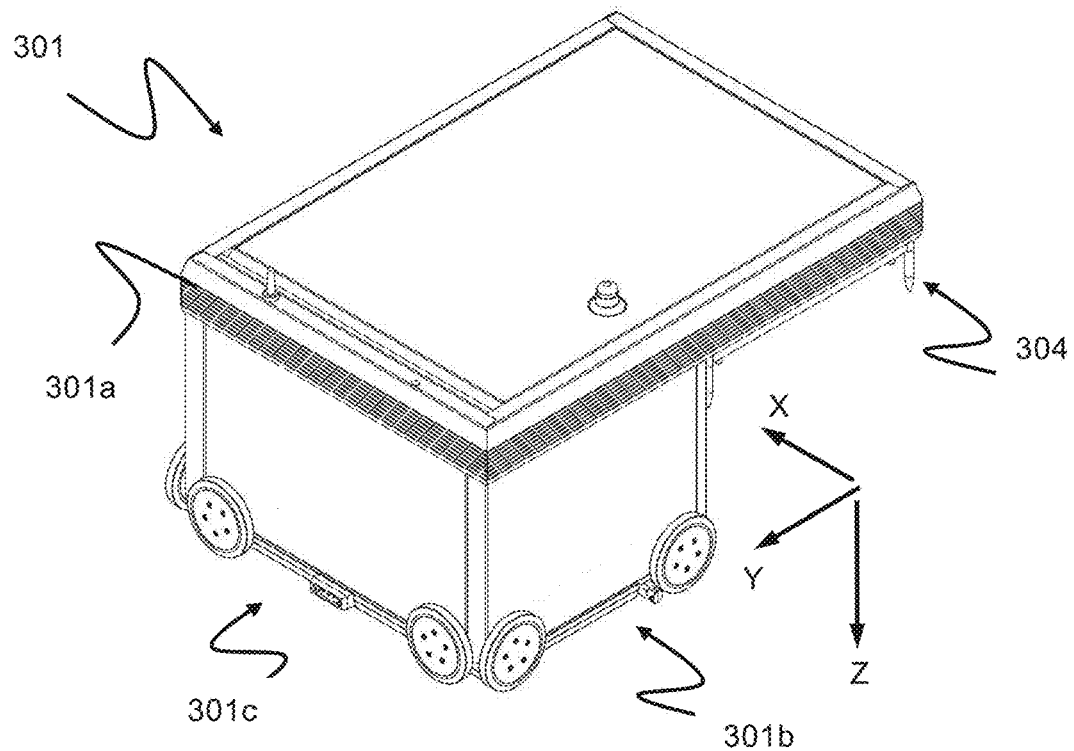
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 4-6.

Figure 4:
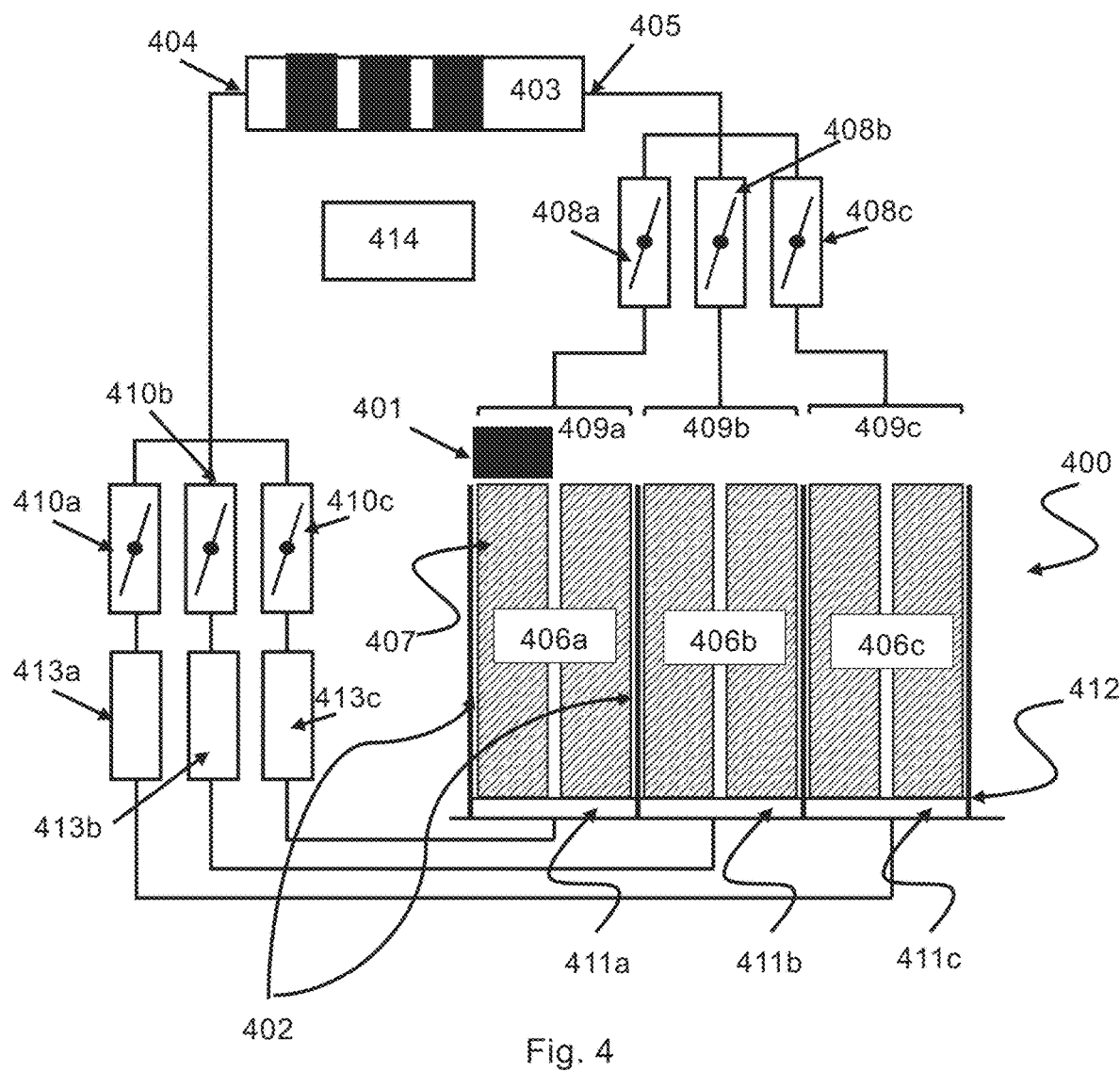
FIG. 4 is a schematic illustration of an exemplary automated storage and retrieval system according to an embodiment of the present invention.

FIG. 4 is a schematic illustration of an automated storage and retrieval system, comprising a framework structure 400 as described above with reference to the framework structure 100. The framework structure 400 is subdivided into a plurality of storage volumes 406a, 406b, 406c, each storage volume 406a, 406b, 406c comprising a plurality of storage columns 105 arranged adjacent one another below the horizontal rails Thus, each of the storage volumes 406a, 406b, 406c may comprise one or more storage columns 105 where storage containers are stacked one on top of one another to form stacks 407. The framework structure 400 comprises a plurality of vertical walls 402 surrounding each of the plurality of storage volumes 406a, 406b, 406c to separate the storage volumes 406a, 406b, 406c from neighboring storage volumes 406a, 406b, 406c and external ambient conditions. The plurality of walls 402 surrounding the storage volumes provides substantially airtight channels extending from below the horizontal rails 110 to a void or voids 411a, 411b, 411c beneath each of the plurality the storage volumes 406a, 406b, 406c. The storage volumes 406a, 406b, 406c are open against the rails such that storage container vehicles 401 may lower and raise storage containers 106 into and out of the storage volumes.

The automated storage and retrieval system comprises a cooler system 403 adapted to draw air from an input 404 of the cooler system 403, cool the air drawn from the input 404, and blow cooled air through an output 405 of the cooler system 403. The cooler system 403 may be a fan-coil unit comprising a heat exchanger, e.g. coil, and a fan, however any suitable cooler system may be used. When the cooler system 403 is a fan-coil unit, the flow of air through the cooler system 403 is driven by the fan in the fan-coil unit. For each of the plurality of storage volumes 406a, 406b, 406c, the system comprises a first air damper 408a, 408b, 408c connected between the output 405 of the cooler system 403 and an air release area 409a, 409b, 409c above the storage volumes 406a, 406b, 406c, and a second air damper 410a, 410b, 410c connected between the void 411a, 411b, 411c beneath the storage volumes 406a, 406b, 406c and the input 404 of the cooler system 403.

Hence each storage volume 406a, 406b, 406c is part of an air circuit that includes its own first air damper 408a, 408b, 408c, its own air release area 409a, 409b, 409c, its own void 411a, 411b, 411c, and its own second air damper 410a, 410b, 410c. The air circuits may share a common conduit from the output 405 of the cooler system 403 to a point at which they divide upstream of the plurality of first air dampers 408a, 408b, 408c, in order to feed into the supply of cooled air to the different first air dampers 408a, 408b, 408c. The air circuits may also share a common conduit from a point at which they combine downstream of the second air dampers 410a, 410b, 410c to return the air to the input 404 of the cooler system 403.

When air is drawn from the voids 411a, 411b, 411c through the respective second air damper 410a, 410b, 410c an underpressure, or vacuum, is created in the voids. The magnitude of the underpressure in the voids 411a, 411b, 411c is controlled by a force drawing air into the cooler system 403 and the airflow through the second air dampers 410a, 410b, 410c. The second air dampers 410a, 410b, 410c are individually adjustable to control the airflow through the second air dampers 410a, 410b, 410c. The force drawing air into the cooler system 403 and felt downstream of the second air dampers 410a, 410b, 410c is identical for each of the second air dampers 410a, 410b, 410c. The underpressure in each of the voids 411a, 411b, 411c is controlled by adjusting the airflow through the respective second air dampers 410a, 410b, 410c. Increasing the airflow through for example one of the second air dampers 410a relative to another one of the second air dampers 410b, would increase the underpressure in void 411a relative to void 411b.

When cooled air is blown through the output 405 of the cooler system 403 and through the first air dampers 408a, 408b, 408c an overpressure is created in the air release areas 409a, 409b, 409c above the storage volumes 406a, 406b, 406c. The magnitude of the overpressure and the temperature in the air release areas 409a, 409b, 409c is controlled by the temperature of the air leaving the cooler system 403, the force blowing air through the output 405 of the cooler system and the airflow through each of the first air dampers 408a, 408b, 408c. The temperature in the air release areas 409a, 409b, 409c may depend to an extent on the shape and/or volume of the air release areas. The first air dampers 408a, 408b, 408c are individually adjustable to control the airflow. The force blowing air out of the output 405 of the cooler system 403 is identical for each of the first air dampers 408a, 408b, 408c. The overpressure and air temperature in each of the air release areas 409a, 409b, 409c is controlled by adjusting the airflow through the respective first air dampers 408a, 408b, 408c. Increasing the airflow through for example one of the first air dampers 408a relative to another one of the first air dampers 408b, would increase the overpressure in air release area 409a relative to air release area 409b.

The system further comprises a controller 414 adapted for controlling the temperature in each of the plurality of storage volumes 406a, 406b, 406c by adjusting airflow through the first damper 408a, 408b, 408c of the particular storage volume 406a, 406b, 406c to control the overpressure and air temperature in the air release area 409a, 409b, 409c associated with the storage volume 406a, 406b, 406c, and to adjust airflow through the second air damper 410a, 410b, 410c of that storage volume 406a, 406b, 406c to control the underpressure in the void 411a, 411b, 411c below the storage volume 406a, 406b, 406c. The pressure differential between the overpressure in the air release area 409a, 409b, 409c and the underpressure in the void 411a, 411b, 411c, determines the speed of air through the respective storage volumes 406a, 406b, 406c. A higher pressure differential increases the speed of air and increases the cooling effect of the air passing through the storage volume 406a, 406b, 406c. A lower pressure differential reduces the speed of air and reduces the cooling effect of the air passing through the storage volume 406a, 406b, 406c.

By adjusting the airflow through the first and second air dampers, the controller 414 may control a storage volume temperature for each of each of the plurality of storage volumes 406a, 406b, 406c, where the storage volume temperature is regulated by the air temperature in the air release area 409a, 409b, 409c and by controlling the pressure differential between the overpressure in the air release area 409a, 409b, 409c and the underpressure in the void 411a, 411b, 411c.

Each of the storage volumes 406a, 406b, 406c may comprise at least one temperature sensor, and the controller 414 may be adapted to adjust the first air damper 408a, 408b, 408c and the second air damper 410a, 410b, 410c based on a temperature measured by the at least one temperature sensor. The temperature sensor may be positioned anywhere within the walls of the storage volume.

The controller 414 may comprise a plurality of control units, one for controlling the temperature in each of the storage volumes 406a, 406b, 406c.

The system may further comprise a fan 413a, 413b, 413c positioned between the void 411a, 411b, 411c and the second air damper 410a, 410b, 410c. The fan 413a, 413b, 413c may be used to increase the underpressure in the void 411a, 411b, 411c when necessary to maintain the differential pressure. In the illustrated embodiment, a fan 413a, 413b, 413c is provided for each storage volume 406a, 406b, 406c to force the airflow as required for each storage volume 406a, 406b, 406c. In another embodiment, the fan 413a, 413b, 413c, may be common fan for all the storage volumes 406a, 406b, 406c. This embodiment is easier to implement at the cost of less control of the airflow in each storage volume.

In one embodiment, one of the storage volumes 406a holds a storage volume temperature suitable for fruit, vegetables, flowers, etc., e.g. 10° C., another of the storage volumes 406b holds a storage volume temperature suitable for easily perishable food such as meat, fish, dairy produce, etc., e.g. 1-4° C., and the third storage volume 406c holds a freezing temperature, i.e. below 0° C., typically −20° C. There may of course be more than three storage volumes and each storage volume may have a different storage volume temperature. There may also be several storage volumes having similar storage volume temperatures. The controller 414 may also adjust the storage volume temperature in a storage volume from ambient to freezing, or the other way around, depending on current or future storage needs.

In one embodiment, the storage and retrieval systems 1 may be used for vertical farming where crops are grown in the vertical stacks 407. The vertical stacks 407 may comprise specialised storage containers 406 adapted to allow air and light into the storage containers for the crops, or other suitable stacked vertical farming systems. In this embodiment, each storage volume may have a different controlled environment for optimal growth conditions for different crops.

In one embodiment, each of the air release areas 409a, 409b, 409c is positioned above the container handling vehicles 401, allowing the container handling vehicle to move on the horizontal rails 110 to lower and raise storage containers 106 and move the storage containers around the storage system 1. The air release areas 409a, 409b, 409c may be adapted to shield each of the air release areas 409a, 409b, 409c from any neighboring air release area, such that the air temperature and overpressure in one air release area is substantially independent of the air temperature and overpressure in the neighboring air release area. Any suitable shielding methodology may be used. In one embodiment, the air release areas 409a, 409b, 409c may be in the shape of hoods separating the air release areas above the container handling vehicles 401. In another embodiment, the air release areas 409a, 409b, 409c may in the shape of directional nozzles above the container handling vehicles 401. Air curtains and the like may be used to help separate the areas.

In a large automated storage and retrieval system 1 may need require more cooling than it is possible to provide by one cooling system 403. In order to fulfill the requirements, a large automated storage and retrieval system may be provided with a plurality of cooling systems 403, each of the plurality of cooling systems 403 cooling a plurality of storage volumes as described above. The cooling system or cooling system 403 may take up the entire automated storage and retrieval system or only a portion thereof.

Figure 6:
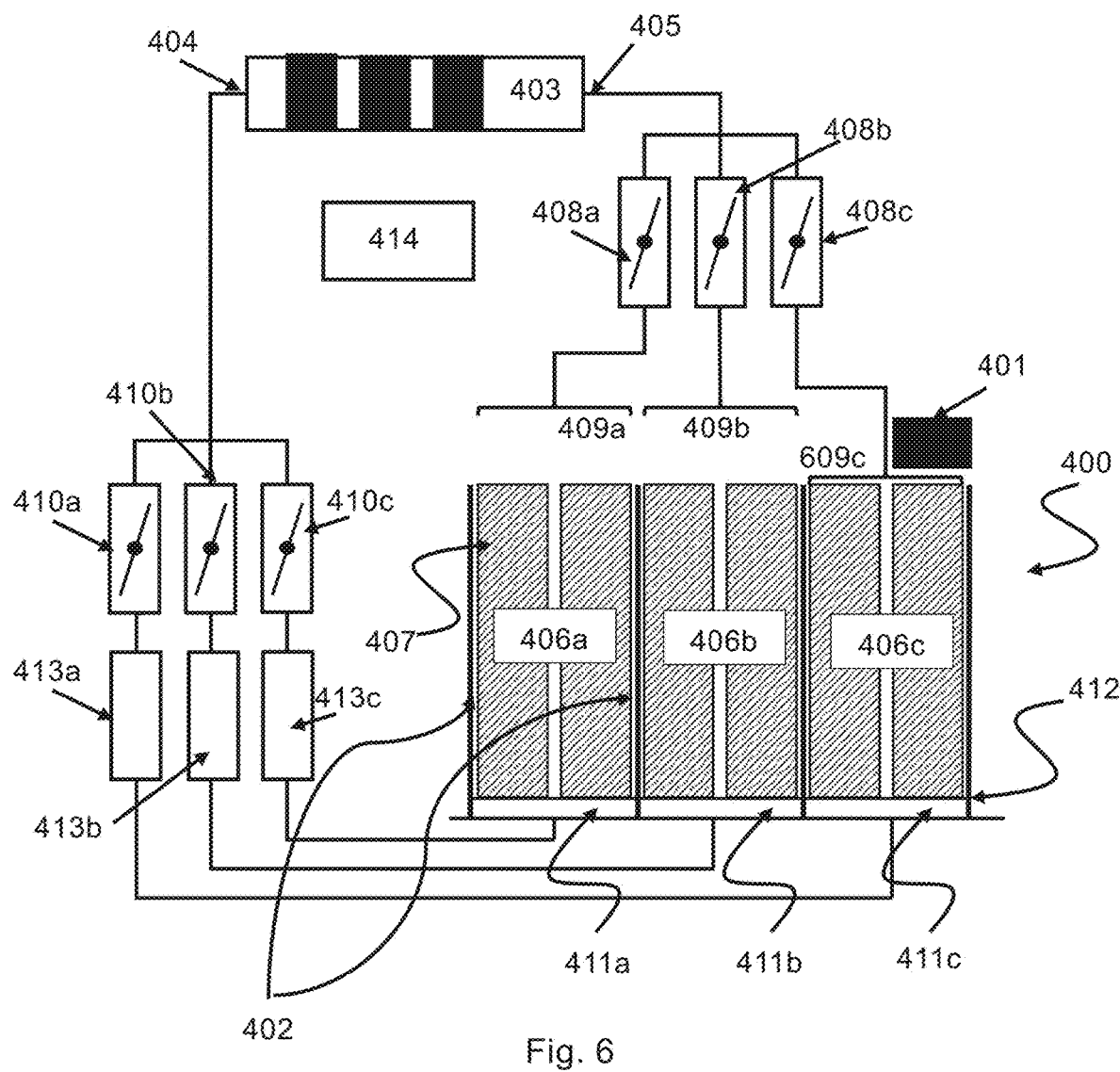
FIG. 6 is a schematic illustration of an exemplary automated storage and retrieval system according to an embodiment of the present invention.

FIG. 6 is a schematic illustration on an alternative embodiment, where one of the air release areas 609c is arranged below the horizontal rails 110 adjacent the upper ends of the upright members 102. In this embodiment the output of the first air damper 408c is vented directly into the storage volume 406c. The air release area 409 may comprise a plurality of vents surrounding the upper end of the storage volume 406c.

One advantage of arranging the air release area 609c below the horizontal rails 110 is that the cold air entering the grid creates a "cold curtain", preventing air moving freely between the container handling vehicle environment and the storage volume environment. This prevents that the container handling vehicle environment temperature is below 0° C., thus allowing the container handling vehicles to work within their normal operating window.

In one embodiment, the cooler system 403 may comprise a heat exchanger that cools the air drawn from the input, the heat or a portion of the heat may be transferred to one of the storage volumes 406a, 406b, 406c. This may be useful for the warmer storage volumes or if it is required to heat a freezing zone quickly due to changing storage system needs.

In one embodiment, the plurality of vertical walls 402 comprises a thermal insulating material. The wall may be made of a thermal insulating material, the wall may be covered by an insulating material, or the thermal insulating material may be part of a sandwich wall construction. Vertical walls 403 comprising a thermal insulating material is particularly useful when the difference in storage volume temperatures between two neighboring storage volumes is too high to control by airflow only.

Figure 5A:
FIG. 5a is a side view of an exemplary bottom panel according to an embodiment of the present invention.
Figure 5B:
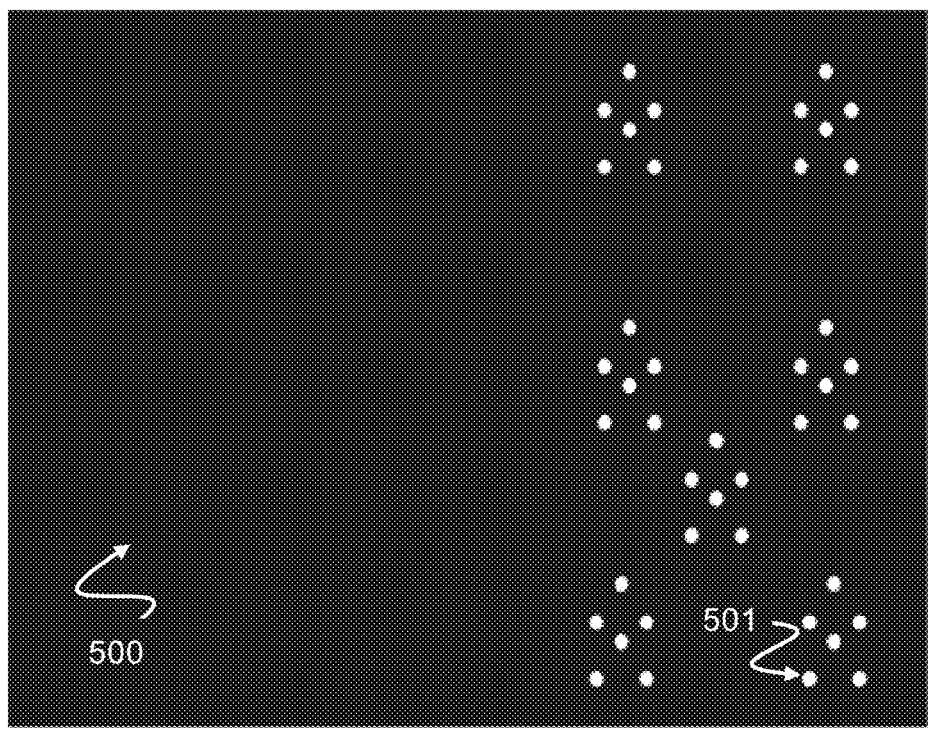

Now with reference to FIG. 4, FIGS. 5a and 5b, the system may further comprise a floor 412 with a plurality of ventilation holes provided between the storage volume 406a, 406b, 406c and the void 411a, 411b, 411c beneath the storage volume 406a, 406b, 406c, where a total area of each of the plurality of ventilation holes increases with the horizontal distance of the ventilation hole from an air outlet communicating air from the void 411a, 411b, 411c to the second air damper 410a, 410b, 410c. The total area of each of the plurality of ventilation holes may be varied by the number and/or size of ventilation holes. Small and/or few ventilation holes close to the air outlet and larger and/or more ventilation holes further away from the air outlet will create a more uniform airflow and more uniform cooling within each storage volume. The total area of each of the plurality of ventilation holes may be adjustable, e.g. using an aperture plate over another aperture plate where the two aperture plates are moved relative to each other.

The plurality of ventilation holes may be provided by a plurality of perforations 501 in panels 500 forming the floor 412 arranged between the storage volumes 406a, 406b, 406c and the void 411a, 411b, 411c at a lower end of the storage volumes 406a, 406b, 406c The storage volume temperatures in the plurality of storage volume of the automated grid based storage and retrieval system 1 described in detail above may be controlled by a method comprising the steps of:
- adjusting the cooler system 403 to blow cooled air through the output 405 of the cooling system at a first temperature;
- adjusting, independently for each of the plurality of storage volumes 406a, 406b, 406c, the airflow through the first air damper 408a, 408b, 408c to control the overpressure and the air temperature in the air release area 409a, 409b, 409c, 609c above that storage volume 406a, 406b, 406c, and the airflow through the second air damper 410a, 410b, 410c to control the underpressure in the void 411a, 411b, 411c below that storage volume, such that a storage volume temperature is regulated by the air temperature in the air release area 409a, 409b, 409c, 609c above that storage volume and by controlling the pressure differential between the overpressure in the air release area 409a, 409b, 409c, 609c and the underpressure in the void 411a, 411b, 411c associated with that storage volume for each of the storage volumes 406a, 406b, 406c.

The first air damper 408a, 408b, 408c and the second air damper 410a, 410b, 410c may be adjusted for a given storage volume based on a temperature measured by a temperature sensor in that storage volume 406a, 406b, 406c.

The airflow from the first air damper 408a, 408b, 408c may be directed an air release area arranged below the horizontal rails 110 adjacent the upper ends of the upright members 102.

Heat from a heat exchanger in the cooler system 403 may be transferred to at least one of the plurality of storage volumes 406a, 406b, 406c.

A fan 413a, 413b, 413c positioned between the void 411a, 411b, 411c and the second air damper 410a, 410b, 410c may be adjusted to adjust the underpressure in the void 411a, 411b, 411c.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
121 Control system
X First direction
Y Second direction
Z Third direction
400 Framework structure
401 Storage container vehicle
402 Vertical airtight wall
403 Cooler system
404 Cooler system input
405 Cooler system output
406a Storage volume A 406b Storage volume B
406c Storage volume C
407 Stack
408a First air damper A
408b First air damper B
408c First air damper C
409a Air release area A
409b Air release area B
409c Air release area C
609c Air release area C
410a Second air damper A
410b Second air damper B
410c Second air damper C
411a Void beneath storage volume A
411b Void beneath storage volume B
411c Void beneath storage volume C
412 Floor
413a Fan
413b Fan
413c Fan
414 Controller
500 Bottom panel
501 Perforation in bottom panel 600

The invention claimed is:

1. An automated grid based storage and retrieval system, comprising:
a framework structure comprising upright members and a grid of horizontal rails provided at upper ends of the upright members, the framework structure defining a plurality of storage volumes arranged adjacent one another below the horizontal rails, the storage volumes are open against the horizontal rails such that storage container vehicles may lower and raise storage containers into and out of the storage volumes,
a plurality of vertical walls surrounding each of the plurality of storage volumes,
a cooler system adapted to draw air from an input of the cooler system, cool the air drawn from the input, and blow cooled air through an output of the cooler system,
for each of the plurality of storage volumes, the system further comprises a first air damper connected between the output of the cooler system and an air release area above the storage volume, and a second air damper connected between a void beneath the storage volumes and the input of the cooler system,
a controller, the controller adapted, independently for each of the plurality of storage volumes, to adjust airflow through the first air damper associated with that storage volume to control an overpressure and air temperature in the air release area, and to adjust airflow through the second air damper associated with that storage volume to control an underpressure in the void, such that a storage volume temperature is controlled separately for each of the plurality of storage volumes, the storage volume temperature being regulated by the air temperature in the air release area and by controlling a pressure differential between the overpressure in the air release area and the underpressure in the void in each of the storage volumes.

2. The system according to claim 1, wherein the air release area is arranged above the horizontal rails at a distance allowing a container handling vehicle on the horizontal rails to move immediately below the air release area.

3. The system according to claim 1, wherein the air release area is arranged below the horizontal rails adjacent the upper ends of the upright members.

4. The system according to claim 1, wherein the vertical walls comprises a thermal insulating material.

5. The system according to claim 1, wherein the cooler system comprises a heat exchanger, the heat exchanger adapted to cool the air drawn from the input, and further adapted to transfer heat to at least one of the plurality of storage volumes.

6. The system according to claim 1, the system further comprises a fan positioned between the void and the second air damper.

7. The system according to claim 1, wherein the cooler system is a fan-coil unit.

8. The system according to claim 1, wherein each of the storage volumes comprises a temperature sensor, and the controller is adapted to adjust the airflow through the first air damper and to adjust the airflow through the second air damper based on a temperature measured by the temperature sensor.

9. The system according to claim 1, the system further comprising a floor with a plurality of ventilation holes provided between the storage volume and the void beneath the storage volume, where a total area of each of the plurality of ventilation holes increases with a horizontal distance of the ventilation hole from an air outlet communicating air from the void to the second air damper.

10. The system according to claim 9, wherein the plurality of ventilation holes is provided by a plurality of perforations in panels forming the floor arranged between the storage volumes and the void at a lower end of the storage volumes.

11. The system according to claim 1, wherein each air release area is adapted to shield the air release areas from each neighboring air release area.

12. The system according to claim 1, the system further comprising a first common conduit connecting the output of the cooler system with each of the first air dampers, and a second common conduit connecting each of the second air dampers to the input of the cooler system.

13. A method for controlling a plurality of storage volume temperatures in an automated grid based storage and retrieval system comprising:
the method comprising:
adjusting a cooler system to blow cooled air through an output of the cooling system at a first temperature,
adjusting, independently for each of the plurality of storage volumes, an airflow through a first air damper to control an overpressure and an air temperature in an air release area above that storage volume, and the airflow through a second air damper to control an underpressure in a void below that storage volume, such that the storage volume temperature is regulated by the air temperature in the air release area above that storage volume and by controlling a pressure differential between the overpressure in the air release area and the underpressure in the void associated with that storage volume for each of the storage volumes.

14. The method according to claim 13, further comprising: directing the airflow from the first air damper to an air release area arranged below horizontal rails adjacent upper ends of upright members.

15. The method according to claim 13, wherein the method further comprises a step of transferring heat from a heat exchanger in the cooler system to at least one of the plurality of storage volumes.

16. The method according to claim 13, wherein the method further comprises adjusting a fan positioned between the void and the second air damper to adjust the underpressure in the void.

17. The method according to claim 13, wherein the method further comprises adjusting the first air damper and the second air damper for a given storage volume based on a temperature measured by a temperature sensor in that storage volume.

\* \* \* \* \*